(12) United States Patent
Sakaitani et al.

(10) Patent No.: US 7,601,323 B2
(45) Date of Patent: Oct. 13, 2009

(54) METHOD FOR PRODUCING HYDROGEN PEROXIDE

(75) Inventors: Hisashi Sakaitani, Ibaraki (JP); Katsuhiro Iura, Ibaraki (JP); Isao Hagiwara, Ibaraki (JP); Hiroshi Hasegawa, Ibaraki (JP); Hisashi Matsuda, Ibaraki (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 117 days.

(21) Appl. No.: 11/826,319

(22) Filed: Jul. 13, 2007

(65) Prior Publication Data

US 2008/0213164 A1 Sep. 4, 2008

(30) Foreign Application Priority Data

Jul. 14, 2006 (JP) ............... 2006-193559

(51) Int. Cl.
*C01B 15/023* (2006.01)
(52) U.S. Cl. ...................... 423/590; 423/588
(58) Field of Classification Search ............. None
See application file for complete search history.

(56) References Cited

U.S. PATENT DOCUMENTS 5,399,333 A * 3/1995 Kato et al. ............. 423/588
6,153,169 A * 11/2000 Glenneberg et al. ......... 423/588

FOREIGN PATENT DOCUMENTS

EP 0 603 624 A 6/1994
EP 1 101 733 5/2001
GB 943 683 A 12/1963
JP 06-191803 7/1994
JP 2001-163608 6/2001
JP 2002-511377 4/2002
WO WO 95/28350 A 10/1995

OTHER PUBLICATIONS

Goor, G., et al.: "Hydrogen Peroxide", Ullmann's Encyclopedia of Industrial Chemistry, vol. A13, pp. 447-457, 1989.

* cited by examiner

*Primary Examiner*—Melvin C Mayes
*Assistant Examiner*—Melissa Stalder
(74) *Attorney, Agent, or Firm*—Morgan, Lewis & Bockius LLP

(57) ABSTRACT

The present invention provides a method for producing hydrogen peroxide, comprising the steps of: alternately reducing and oxidizing a working solution containing anthraquinone compounds as a reaction medium, wherein a mixture of alkyl-substituted anthraquinones and alkyl-substituted tetrahydroanthraquinones in a molar ratio of from 2:1 to 8:1 is used as the anthraquinone compounds in the working solution, in the reduction step all of the tetrahydroanthraquinones and some or all of the anthraquinones in the working solution are reduced; and keeping the content of alkyl-substituted anthrahydroquinones in the working solution after the reduction step and before the oxidation step higher than the content of alkyl-substituted tetrahydroanthrahydroquinones, wherein ethylanthraquinone and ethyltetrahydroanthraquinone are used as anthraquinone compounds in the working solution in a total proportion of both of from 10 to 45 mol % of all of the anthraquinone compounds in the working solution.

6 Claims, 3 Drawing Sheets

METHOD FOR PRODUCING HYDROGEN PEROXIDE

CROSS-REFERENCE TO RELATED APPLICATIONS

This Application claims the benefit of Japanese patent application number JP2006-193559, which was filed on Jul. 14, 2006 and is incorporated herein by reference in its entirety.

BACKGROUND OF THE INVENTION

1. Field of the Invention

The present invention relates to an improved method for producing hydrogen peroxide continuously by repeatedly reducing and oxidizing anthraquinone compounds (hereinafter this refers to an anthraquinone and/or a tetrahydroanthraquinone) contained in a working solution. More specifically, the present invention relates to a method for producing hydrogen peroxide characterized in that specified amounts of ethylanthraquinone and ethyltetrahydroanthraquinone are used as the anthraquinone compounds.

2. Description of the Related Art

An anthraquinone process is known as an industrial hydrogen peroxide production process. In this process, an anthraquinone compound is dissolved in an organic solvent to obtain a working solution, and in a hydrogenation step the anthraquinone compound is reduced with hydrogen in the presence of a hydrogenation catalyst so as to produce an anthrahydroquinone compound. Next, in an oxidation step the anthrahydroquinone compound is converted back into the anthraquinone compound, with hydrogen peroxide being produced at the same time. The hydrogen peroxide in the working solution is separated out from the working solution by a process such as water extraction. The working solution from which the hydrogen peroxide has been extracted is returned into the hydrogenation step, whereby a cyclic process is formed.

The hydrogenation step is the most important step in the anthraquinone process, and as a characteristic feature can be broadly classified according to whether an anthraquinone (hereinafter this refers to either a substituted anthraquinone or unsubstituted anthraquinone) is used, or a tetrahydroanthraquinone (hereinafter this refers to either a substituted tetrahydroanthraquinone or unsubstituted tetrahydroanthraquinone) is used, or both are used as a reaction medium.

Prior art in which an anthraquinone or a tetrahydroanthraquinone is used as the reaction medium is collected together in Japanese Patent Application Laid-open No. 6-191803. That is, hitherto, problems have been cited that in the case that a tetrahydroanthraquinone is used as the reaction medium, the reaction conditions in the oxidation step must be strengthened, whereas in the case that an anthraquinone is used as the reaction medium, the solubility of the anthrahydroquinone produced through the hydrogenation is low. As a method for producing hydrogen peroxide efficiently and economically, there has thus been proposed a hydrogen peroxide production process in which in the reduction step all of a tetrahydroanthraquinone and some or all of an anthraquinone in a working solution are reduced, and the content of an anthrahydroquinone in the working solution after the reduction step is kept higher than the content of a tetrahydroanthrahydroquinone. That is, in Japanese Patent Application Laid-open No. 6-191803, there is proposed a process according to which the amount of hydrogen peroxide obtained per cycle is kept high. Moreover, by using more of the anthrahydroquinone for which the oxidation reaction proceeds readily than the tetrahydroanthrahydroquinone for which the oxidation reaction rate is slow, the energy consumption in the oxidation step can be kept down.

Moreover, in Japanese Patent Application Laid-open No. 6-191803, a case in which two or more anthraquinone compounds are used is introduced, the use of such a mixture of anthraquinone compounds having been known from long ago.

In Japanese Patent Application Laid-open No. 2001-163608 and Published Japanese Translation of PCT Application No. 2002-511377, a case that mainly a tetrahydroanthraquinone is used as the reaction medium is introduced. In Japanese Patent Application Laid-open No. 2001-163608, a case is shown in which a mixture of an ethylanthraquinone and an amylanthraquinone is used as the anthraquinone compounds, and in Published Japanese Translation of PCT Application No. 2002-511377, a case is introduced in which a mixture of an ethylanthraquinone and novel compounds 2-(4-methyl-3-pentenyl)-anthraquinone and 2-(4-methylpentyl)-anthraquinone is used. These Japanese Patent Application Laid-open No. 2001-163608 and Published Japanese Translation of PCT Application No. 2002-511377 are very similar in that two or more different anthraquinone compounds are used, and mainly a tetrahydroanthraquinone is used as the reaction medium; the difference is the substituents of the anthraquinone compounds used. Moreover, a characteristic feature is that the amount of hydrogen peroxide obtained per cycle is kept high due to using mainly a tetrahydroanthraquinone as the reaction medium.

However, in the case of using mainly a tetrahydroanthraquinone as the reaction medium, strengthening the conditions in the oxidation step for the tetrahydroanthrahydroquinone which has a slow oxidation reaction rate is a problem as described in Japanese Patent Application Laid-open No. 6-191803. Moreover, the hydrogen peroxide obtained through such a hydrogen peroxide production process using mainly a tetrahydroanthraquinone as the reaction medium has therein a very large amount of decomposition product originating from the tetrahydroanthraquinone. This is decomposed matter having as a main component thereof an alkylated phthalic acid compound originating from the tetrahydroanthraquinone or a tetrahydroanthraquinone epoxide which is an oxidation product of the tetrahydroanthraquinone. The grounds for being originating from the tetrahydroanthraquinone are that the phthalic acid compound obtained is all an alkylated phthalic acid compound originating from the reaction medium. That is, in the case of using 2-ethyltetrahydroanthraquinone as the reaction medium, this generally mainly comprises a β-tetrahydroanthraquinone, and ethylphthalic acid is present in the hydrogen peroxide obtained. Moreover, such alkylated phthalic acid compounds are hardly seen in hydrogen peroxide obtained using a hydrogen peroxide production process in which an anthraquinone compound as described in Japanese Patent Application Laid-open No. 6-191803 is used as the reaction medium. That is, such decomposed matter is a problem due to being present as impurities in the product hydrogen peroxide, this depending on the amount of the tetrahydroanthraquinone in the working solution.

Such impurities can be separated out industrially by any of various processes, but even in the case, for example, of distillation or removal by adsorption, if the amount of impurities in the hydrogen peroxide used as the starting material is high, then the apparatus must be correspondingly large and hence the equipment cost burden becomes high, and moreover the equipment operating time becomes long, and hence this is clearly undesirable. Moreover, when removing the impurities, loss or decomposition of the hydrogen peroxide itself may occur, and hence the burden on the production amount and variable costs cannot be ignored.

Moreover, there are various fields in which the hydrogen peroxide produced may be used, but in any of these fields, for example bleaching of paper pulp, addition to food, or an electronics industry cleaning solution, it is clear that low-impurity hydrogen peroxide is preferable. In particular, hydrogen peroxide for the electronics industry is generally known as ultra-pure hydrogen peroxide, being hydrogen peroxide that has been subjected industrially to special purification, and the amount of impurities in the starting material hydrogen peroxide is a burden as is on the purification process, which is undesirable, and moreover leads to an increase in the amount of impurities in the ultra-pure hydrogen peroxide obtained through the purification, which is undesirable.

Meanwhile, with the process described in Japanese Patent Application Laid-open No. 6-191803, more anthraquinone than tetrahydroanthraquinone is used for the reaction medium, and hence as described above, it is clear that the amount of impurities which comprise mainly an alkylated phthalic acid compound is lower than in the case of using mainly tetrahydroanthraquinone as the reaction medium. However, it is clearly stated in Japanese Patent Application Laid-open No. 6-191803 that it is preferable to use amylanthraquinone as the anthraquinone, and in addition to this an alkylated anthraquinone, i.e. ethylanthraquinone or tertiary-butyl-anthraquinone, or a mixture of a plurality of anthraquinones can be used, but it is not made clear that it is advantageous to use any specific mixture. For example, in the case of using amylanthraquinone whose use is clearly stated as being preferable, with the process of Japanese Patent Application Laid-open No. 6-191803, it is a fact that the reaction rate in the hydrogenation step is reduced. That is, in the hydrogenation step, to make up for the slow reaction, a large reactor is required, and hence the equipment cost burden is increased. Moreover, as another solution, the amount of a catalyst may be increased so as to make up for the slow reaction rate, but not only is purchasing the catalyst an initial investment, moreover there is a problem that upon increasing the amount of the catalyst, the amount of leaching out of metal from the catalyst increases. The metal leaching out from the catalyst may be, for example, palladium, platinum or nickel, and these not only bring about decomposition of the hydrogen peroxide produced in the oxidation step, but moreover leach out as impurities in the hydrogen peroxide produced, so as to become a problem as described above.

Overall, there is a problem that with the process described in Japanese Patent Application Laid-open No. 6-191803, inorganic impurities such as metal contaminate the hydrogen peroxide produced, and with the process described in Japanese Patent Application Laid-open No. 2001-163608 or Published Japanese Translation of PCT Application No. 2002-511377, organic impurities contaminate the hydrogen peroxide produced.

SUMMARY OF THE INVENTION

It is an object of the present invention to provide a method for producing hydrogen peroxide according to which the problems of the prior art described above are resolved, and the impurity content of hydrogen peroxide produced using the anthraquinone process is low.

One embodiment of the present invention is a method for producing hydrogen peroxide by alternately reducing and oxidizing a working solution containing anthraquinone compounds as a reaction medium, wherein a mixture of alkyl-substituted anthraquinones and alkyl-substituted tetrahydroanthraquinones in a molar ratio of from 2:1 to 8:1 is used as the anthraquinone compounds in the working solution, in the reduction step all of the tetrahydroanthraquinones and some or all of the anthraquinones in the working solution are reduced, the method comprises a step of keeping the content of alkyl-substituted anthrahydroquinones in the working solution after the reduction step and before the oxidation step higher than the content of alkyl-substituted tetrahydroanthrahydroquinones, and ethylanthraquinone and ethyltetrahydroanthraquinone are used as anthraquinone compounds in the working solution in a total proportion of both of from 10 to 45 mol % of all of the anthraquinone compounds in the working solution.

In a preferable embodiment, the ethylanthraquinone concentration in the working solution is from 0.10 to 0.45 mol/L. In another preferable embodiment, anthraquinone compounds other than the ethylanthraquinone and the ethyltetrahydroanthraquinone are amylanthraquinone and amyltetrahydroanthraquinone. In another preferable embodiment, a reaction temperature in the oxidation step is not more than 50° C. In another preferable embodiment, there are contained, as solvents for the anthraquinone compounds constituting the reaction medium, an aromatic hydrocarbon being a quinone solvent, and at least one selected from the group consisting of higher alcohols, alkyl phosphates, tetra-substituted urea compounds, cyclohexanol carboxylates, and cyclic urea compounds being a hydroquinone solvent. In another preferable embodiment, the ethylanthraquinone and the ethyltetrahydroanthraquinone are used in a total proportion of both of from 20 to 40 mol % of all of the anthraquinone compounds in the working solution.

According to a preferred embodiment of the present invention, hydrogen peroxide having a low impurity content can be obtained in hydrogen peroxide production using the anthraquinone process.

DESCRIPTION OF THE PREFERRED EMBODIMENTS

Figure 1:
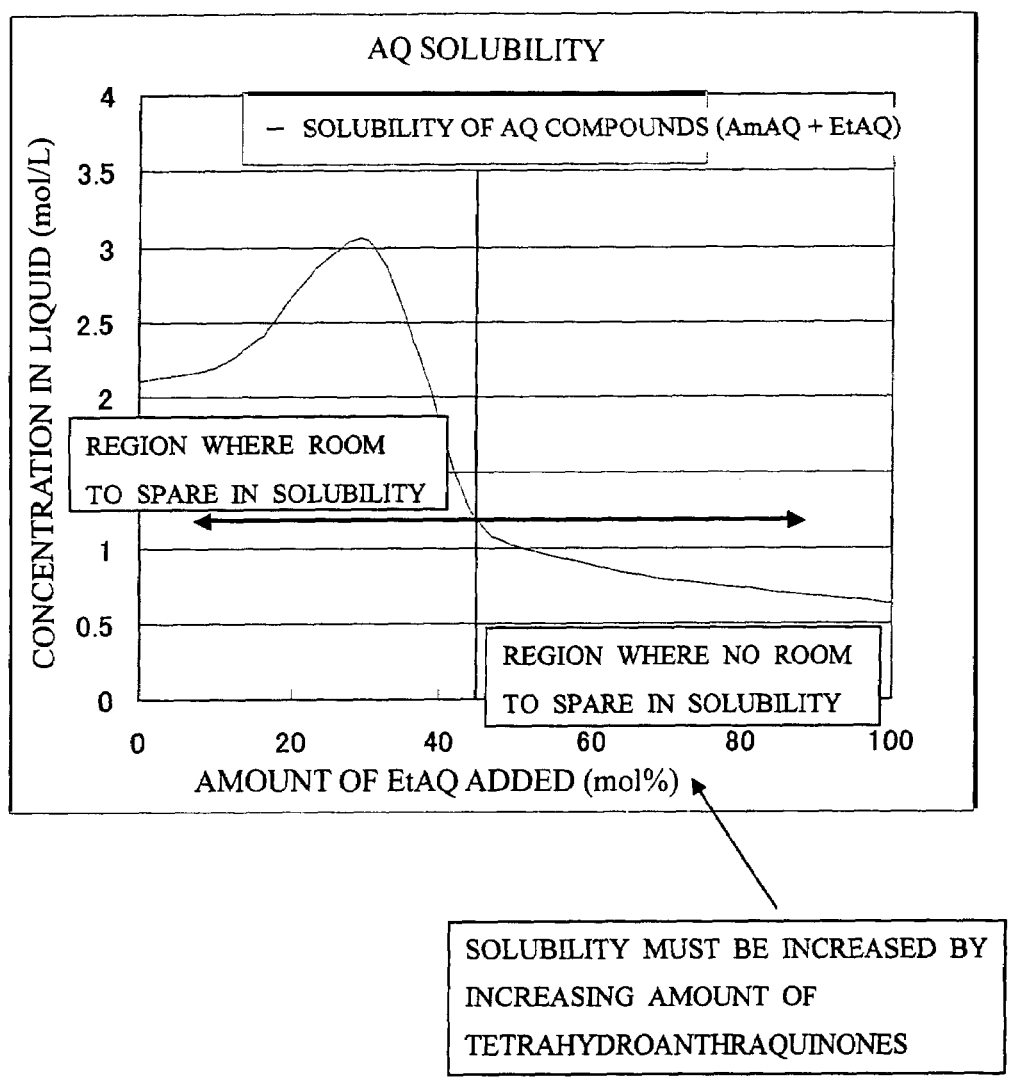
FIG. 1 is a graph showing change in saturated concentration for AmAQ+EtAQ.

Following is a detailed description of the present invention. The following embodiment is merely illustrative for explaining the present invention, and the present invention is not intended to be limited to only this embodiment. So long as the gist is not deviated from, the present invention may be implemented in any of various forms.

In one embodiment of the present invention, there are steps of alternately reducing and oxidizing a working solution containing anthraquinone compounds as a reaction medium, a mixture of alkyl-substituted anthraquinones and alkyl-substituted tetrahydroanthraquinones being used in a molar ratio of from 2:1 to 8:1 as the anthraquinone compounds in the working solution. Moreover, in a reduction step all of the tetrahydroanthraquinones and some or all of the anthraquinones in the working solution are reduced, and the method of the present invention comprises a step of keeping the content of alkyl-substituted anthrahydroquinones in the working solution after the reduction step and before an oxidation step higher than the content of alkyl-substituted tetrahydroanthrahydroquinones. Furthermore, ethylanthraquinone and ethyltetrahydroanthraquinone are used as anthraquinone compounds in the working solution in a total proportion of both of from 10 to 45 mol % of all of the anthraquinone compounds in the working solution.

In the present invention, both tetrahydroanthraquinones and anthraquinones are reduced as the reaction medium, so as to obtain a mixed state of different hydroquinones in the working solution, whereby the solubility of the hydroquinones is increased, and as a result the amount of hydrogen peroxide obtained per cycle of the working solution can be kept high. Moreover, in the present invention, for the reaction medium for producing the hydrogen peroxide, more of the anthrahydroquinones for which the oxidation reaction proceeds readily are used than the tetrahydroanthrahydroquinones for which the oxidation reaction rate is slow, whereby the energy consumption in the oxidation step can be kept down. Moreover, in the present invention, the amount of the tetrahydroanthraquinones used in the reaction medium is restricted to be lower than the amount of anthrahydroquinones in the reduction step, whereby contamination of the produced hydrogen peroxide with decomposed matter originating from the tetrahydroanthraquinones can be reduced.

The anthraquinone compounds used in the present invention are characterized in that the proportion of ethylanthraquinone compounds (hereinafter this refers to ethylanthraquinone and ethyltetrahydroanthraquinone) is from 10 to 45 mol % of all of the anthraquinone compounds. As other anthraquinone compounds, it is particularly preferable to use amylanthraquinone compounds (hereinafter this refers to amylanthraquinone and amyltetrahydroanthraquinone) which have a high solubility; a mixture with a small amount of tertiary-butyl-anthraquinone compounds, unsubstituted anthraquinone compounds or the like may be used.

By using the ethylanthraquinone compounds in the reaction medium, the reaction rate in the hydrogenation step is increased, and hence compared with the case of using mainly amylanthraquinone compounds as the reaction medium, the amount of a catalyst used can be reduced, and hence the amount of metal leaching out from the catalyst can be reduced, and thus leaching out of metal into the product hydrogen peroxide can be reduced. However, it is well known that although the reaction rate is fast for ethylanthraquinone compounds, ethylanthraquinone compounds have a lower solubility in the reaction medium solvent than amylanthraquinone compounds. The solubility of a mixture of amylanthraquinone and ethylanthraquinone is shown in FIG. 1. As is clear from FIG. 1, the solubility changes greatly due to being a eutectic mixture. The concentration of the anthraquinone compounds in the working solution is limited by the density, being substantially not more than 1.2 mol/L; it is undesirable for the concentration to be above this, since then the density increases, and hence liquid separation becomes problematic in an extraction step, and moreover the liquid viscosity increases. For example, an increase in the liquid viscosity causes an increase in the pressure difference for a catalyst filtering filter in the hydrogenation step, whereby the load on a liquid feeding pump increases, which is a problem. That is, as is clear from FIG. 1, the amount of ethylanthraquinone that can be mixed into a working solution at the maximum of 1.2 mol/L is not more than 45 mol %. An effect is obtained even if the amount of the ethylanthraquinone compounds required for increasing the reaction rate is very small, but a marked effect is seen from 10 mol % upwards.

The maximum amount added of ethylanthraquinone can be easily calculated as 1.2 mol/L×0.45 mol %, but in the case of a working solution some of the ethylanthraquinone is converted into ethyltetrahydroanthraquinone as the hydrogenation reaction is repeated. A regeneration reaction is carried out such that the amount of the tetrahydroanthraquinones including the ethyltetrahydroanthraquinone relative to the amount of the anthraquinones is from 1:2 to 1:8. Moreover, a small amount is changed into degraded matter. The actual ethylanthraquinone concentration is thus preferably from 0.1 to 0.45 mol/L by subtraction. More preferably, this is from 0.2 to 0.35 mol/L which is close to the maximum concentration. Moreover, considering the ethyltetrahydroanthraquinone concentration, the proportion of the ethylanthraquinone compounds is more preferably from 20 to 40 mol % of all of the anthraquinone compounds.

Ethyltetrahydroanthraquinone has better solubility than ethylanthraquinone, and hence by increasing the ethyltetrahydroanthraquinone proportion, the mixing ratio of the ethylanthraquinone compounds relative to all of the anthraquinone compounds can be increased. However, reaction conditions for which only the ethyltetrahydroanthraquinone remains without being subjected to the regeneration are difficult, and hence the concentration of the tetrahydroanthraquinones overall increases, and thus accumulation of degraded matter originating from the tetrahydroanthraquinones and contamination of the produced hydrogen peroxide therewith occur.

Incidentally, ethylanthraquinone has smaller molecules than the other anthraquinone compounds, and thus is conjectured to more readily enter the pores in the catalyst, so that the hydrogenation reaction is fast. As a result, the hydrogenation reaction takes place preferentially, and hence the probability of being converted into ethyltetrahydroanthraquinone is high. However, the ethylanthraquinone also readily enters the pores of the regeneration catalyst, and hence the regeneration reaction is also fast. Looking overall, the ethyltetrahydroanthraquinone proportion thus fluctuates approximately proportionately with the total concentration of the tetrahydroanthraquinones.

Moreover, one other advantage of using a mixture with ethylanthraquinone is that the hydrogenation degree in the hydrogenation step can be reduced.

Hydrogenation degree (%)=hydroquinones (: amount of hydrogen peroxide obtained (mol))/quinones (mol)      Equation (1)

\* hydroquinones (ethyltetrahydroanthrahydroquinone, amyltetrahydroanthrahydroquinone, ethylanthrahydroquinone, amylanthrahydroquinone, etc. . . . ) quinones (ethyltetrahydroanthraquinone, amyltetrahydroanthraquinone, ethylanthraquinone, amylanthraquinone, etc. . . . )

As described above, the anthraquinone solubility is limited by the density so as to determine the maximum amount dissolved, and ethylanthraquinone has a lower molecular weight than other anthraquinones, mainly amylanthraquinone in the present invention, and hence comparing at the same density, the maximum amount dissolved (: number of mols) can be increased. That is, the denominator in Equation (1) can be increased, and hence overall the hydrogenation degree can be reduced. It is well known that if the hydrogenation degree is high, then the tetrahydroanthraquinone selectivity worsens. In addition, the amount of organic compound impurities in the hydrogen peroxide produced also increases, and hence this is undesirable. The hydrogenation degree must thus be reduced as much as possible, and using a mixture with ethylanthraquinone compounds is preferable in this respect.

The hydroquinone solubility changes depending on the mixing ratio between tetrahydroanthrahydroquinones and anthrahydroquinones; if the concentration of the hydroquinones in the working solution is increased, then as well as the above hydrogenation degree, the concentration of partially liberated hydrogen peroxide becomes too high in the oxidation step, and hence a safety problem arises. A mixing ratio giving a preferable solubility is thus selected considering safety and economics. The ratio between the anthraquinones and the tetrahydroanthraquinones in the working solution used in the present invention is preferably adjusted to be from 2:1 to 8:1, more preferably from 3:1 to 6:1.

Reducing the energy consumption in the oxidation step through the present invention can be achieved by using predominantly anthrahydroquinones for which the oxidation proceeds readily in the reaction medium. The reaction temperature in the oxidation step is thus preferably made to be not more than 50° C. from the viewpoint of safety. A reaction temperature of from 35 to 45° C. is more preferable. In the case that the temperature exceeds 50° C., depending on the solvent used this may be close to the flash point so that the risk of explosion is increased. Moreover, the reaction temperature becomes high, and hence production of oxidized impurities typified by tetrahydroanthraquinone epoxides in the oxidation reaction is promoted, which is undesirable. These oxidized impurities of course accumulate in the working solution, and moreover the amount of impurities contaminating the hydrogen peroxide produced increases, which is undesirable. There are no particular limitations on the pressure range in the oxidation step, but it is preferable to carry out the oxidation step in a range of from 0.01 to 1.0 MPa. From common sense, considering the load on the reaction apparatus and a compressor, carrying out the oxidation step at a lower pressure is more economical. There are also no particular limitations on the reaction apparatus in the oxidation step, it being possible to use an oxidation tower that is common knowledge in chemical engineering. For example, there are no particular limitations on whether counterflow oxidation or parallel flow oxidation is used, it being possible to use either utilizing the technical merits thereof.

A solvent used for preparing the working solution in the present invention preferably contains an aromatic hydrocarbon being a quinone solvent, and at least one selected from the group consisting of higher alcohols, alkyl phosphates, tetrasubstituted urea compounds, cyclohexanol carboxylates, and cyclic urea compounds being a hydroquinone solvent. There are no particular limitations on the operating conditions in the reduction step in the present invention, but there can be preferably used a method in which the reduction is carried out using hydrogen or a hydrogen-containing gas in a pressure range of from 0.01 to 1.0 MPa and a temperature range of from 10 to 80° C. in the presence of a catalyst such as a palladium catalyst, a platinum catalyst or a nickel catalyst. There are no limitations on the form of the reaction apparatus, it being possible to use a fixed bed reaction apparatus, a fluidized bed reaction apparatus, or a stirred reaction apparatus.

EXAMPLES

Following is a more detailed description of the present invention through examples; however, the present invention is not limited to these examples. In the following Examples, amylanthraquinone is referred to as "AmAQ", and ethylanthraquinone as "EtAQ".

Example 1

The amount of hydrogen absorbed by a working solution was evaluated with an anthraquinone concentration in the working solution of 0.6 mol/L, and a composition ratio of EtAQ (30 mol %)+AmAQ (70 mol %).

Figure 2:
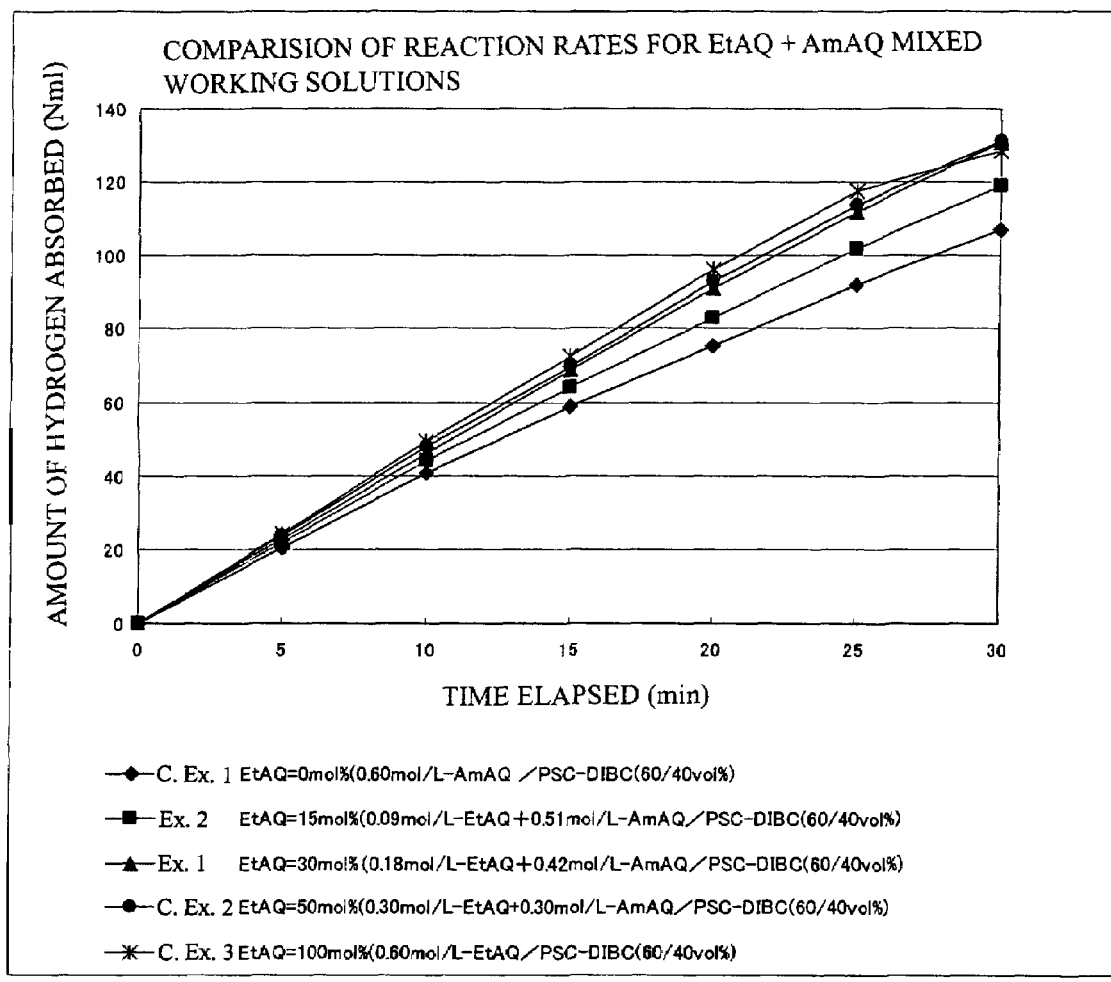
FIG. 2 is a graph showing the change in amount of hydrogen absorbed with time elapsed obtained for Examples 1 and 2 and Comparative Examples 1 to 3.

The specific measurement method is described below. 100 mg of a palladium supported catalyst (corresponding to 1 mg of Pd) and 25 ml of the working solution were put into a 100 ml three-mouth flask. A mixed solvent of 60 vol % of pseudocumene and 40 vol % of diisobutylcarbinol was used as the solvent for the working solution. The flask, which could have the inside thereof perfectly sealed and was equipped with a magnetic induction type stirrer and a vacuum tap, was installed in an ordinary pressure hydrogenation reaction apparatus. With this apparatus, pressure fluctuations in the flask were detected through the water level, and hydrogen in an amount corresponding to the hydrogen absorption was supplied in from a measuring tube via a relay type electromagnetic valve. The hydrogen measuring tube comprised a buret portion and a water storage portion, water in the hydrogen measuring tube acting as a piston, so that the pressure in the flask was kept equal to atmospheric pressure. The amount of hydrogen absorbed was measured from the difference in liquid level in the hydrogen measuring tube. The flask was immersed in a water bath at 30° C., and exhaustion of the inside of the flask and introduction of hydrogen were repeated three times. After 5 minutes, the stirrer was operated, whereby hydrogen absorption was commenced, and then the hydrogen absorption was measured from commencement up to after 30 minutes. This was converted into the amount of hydrogen absorbed at 0° C. and 1 atm. The amount of hydrogen absorbed was 131 Nml. The hydrogen absorption amount results are shown in FIG. 2.

Example 2

The hydrogen absorption amount was measured using the same method as in Example 1, except that the composition was made to be ETAQ (15 mol %)+AmAQ (85 mol %). The amount of hydrogen absorbed was 119 Nml. The hydrogen absorption amount results are shown in FIG. 2.

Comparative Example 1

The hydrogen absorption amount was measured using the same method as in Example 1, except that the composition was made to be AmAQ (100 mol %). The amount of hydrogen absorbed was 107 Nml. The hydrogen absorption amount results are shown in FIG. 2.

Comparative Example 2

The hydrogen absorption amount was measured using the same method as in Example 1, except that the composition was made to be EtAQ (50 mol %)+AmAQ (50 mol %). The amount of hydrogen absorbed was 132 Nml. The hydrogen absorption amount results are shown in FIG. 2.

Comparative Example 3

The hydrogen absorption amount was measured using the same method as in Example 1, except that the composition was made to be ETAQ (100 mol %). The amount of hydrogen absorbed was 128 Nml. The hydrogen absorption amount results are shown in FIG. 2.

As is clear from FIG. 2, the hydrogen absorption amount increased upon increasing the proportion of EtAQ. However, the effect was not very large for a proportion of ETAQ added of from 30 to 50 mol %. Moreover, at EtAQ=100 mol %, the absorption amount decreased in the latter half. This is because precipitation occurred due to the insufficient solubility of the ethylanthrahydroquinone, and hence the pores of the catalyst were clogged up, and thus the catalytic activity dropped.

Example 3

Using a hydrogen peroxide production apparatus having a hydrogenation step, an oxidation step, an extraction step and a regeneration step, a working solution was cycled around, and the composition of the hydrogen peroxide produced was investigated.

The hydrogen peroxide production apparatus was constituted as follows.

Hydrogenation step: Stirred hydrogenation reactor, hydrogenation catalyst Pd supported catalyst Oxidation step: multi-stage counterflow oxidation tower type (reaction temperature: 40° C.)

The working solution was one used for a long time, the composition thereof containing aged degraded matter that could not be analyzed. The main composition of the anthraquinone compounds in the working solution, and the amount of phthalic acid compounds in the hydrogen peroxide obtained were as follows.

Anthraquinone Compounds in Working Solution amylanthraquinone=420 mmol/L; amyltetrahydroanthraquinone=80 mmol/L; ethylanthraquinone=200 mmol/L; ethyltetrahydroanthraquinone=35 mmol/L Concentration of phthalic acid compounds (ethylphthalic acid+amylphthalic acid) in hydrogen peroxide=0.1 mg/$H_2O_2$-kg The molar ratio between the total amount of amyltetrahydroanthraquinone and ethyltetrahydroanthraquinone and the total amount of amylanthraquinone and ethylanthraquinone was 1:5.4.

Comparative Example 4

Using the same apparatus as in Example 3, operation was carried out under the same conditions as in Example 3, except that the working solution used had the following composition. In particular, the hydrogenation degree, the extracted hydrogen peroxide concentration and so on were made to be the same, so that the influence of the extraction could be ignored.

Anthraquinone Compounds in Working Solution amylanthraquinone=250 mmol/L; amyltetrahydroanthraquinone=250 mmol/L; ethylanthraquinone=120 mmol/L; ethyltetrahydroanthraquinone=120 mmol/L Concentration of phthalic acid compounds (ethylphthalic acid+amylphthalic acid) in hydrogen peroxide=0.4 mg/$H_2O_2$-kg The molar ratio between the total amount of amyltetrahydroanthraquinone and ethyltetrahydroanthraquinone and the total amount of amylanthraquinone and ethylanthraquinone was 1:1.

Comparative Example 5

Using the same apparatus as in Example 3, operation was carried out under the same conditions as in Example 3, except that the working solution used had the following composition. In particular, the hydrogenation degree, the extracted hydrogen peroxide concentration and so on were made to be the same, so that the influence of the extraction could be ignored.

Anthraquinone Compounds in Working Solution ethylanthraquinone=350 mmol/L; ethyltetrahydroanthraquinone=400 mmol/L Concentration of phthalic acid compounds (ethylphthalic acid+amylphthalic acid) in hydrogen peroxide=0.6 mg/$H_2O_2$-kg The molar ratio between the total amount of amyltetrahydroanthraquinone and ethyltetrahydroanthraquinone and the total amount of amylanthraquinone and ethylanthraquinone was 1:0.9. Because the ethyltetrahydroanthraquinone proportion was high, operation was possible even in the absence of amylanthraquinone compounds which have high solubility.

From the results of Example 3 and Comparative Examples 4 and 5, it was found that as the proportion of tetrahydroanthraquinones in the working solution was increased, the concentration of phthalic acid compounds in the hydrogen peroxide increased.

Example 4

Evaluation of Stability of Anthraquinone Compounds

A 4% NaOH solution for promoting decomposition of hydrogen peroxide was added to a working solution containing amylanthraquinone and amyltetrahydroanthraquinone and stirring was carried out, and then 60% hydrogen peroxide was instilled in.

The reaction liquid was gradually heated from room temperature, ultimately reaching 60° C. Liquid was sampled during the reaction and analyzed by HPLC, whereupon it was found that the amount of amyltetrahydroanthraquinone decreased and amyltetrahydroanthraquinone epoxide was produced. 8 hours after commencement of reaction 80% of the amyltetrahydroanthraquinone had been lost, and moreover the amount of amyltetrahydroanthraquinone epoxide had also decreased. In contrast with this, the amylanthraquinone concentration did not change but rather was constant.

After the reaction, the aqueous layer was separated off, acidification was carried out with sulfuric acid, and extraction was carried out with chloroform, whereupon amylphthalic acid was detected. The amount of amylphthalic acid obtained corresponded to 60% of the original amyltetrahydroanthraquinone.

Example 5

Evaluation of Stability of Anthraquinone Compounds

A stability test was carried out as in Example 4 on a working solution containing ethylanthraquinone and ethyltetrahydroanthraquinone. As in Example 4, the reaction liquid was gradually heated from room temperature, ultimately reaching 60° C. Liquid was sampled during the reaction and analyzed by HPLC, whereupon it was found that the amount of ethyltetrahydroanthraquinone decreased and ethyltetrahydroanthraquinone epoxide was produced. 6 hours after commencement of reaction 90% of the ethyltetrahydroanthraquinone had been lost, and moreover the amount of ethyltetrahydroanthraquinone epoxide had also decreased. In contrast with this, the ethylanthraquinone concentration did not change but rather was constant.

After the reaction, the aqueous layer was separated off, acidification was carried out with sulfuric acid, and extraction was carried out with chloroform, whereupon ethylphthalic acid was detected. The amount of ethylphthalic acid obtained corresponded to 70% of the original ethyltetrahydroanthraquinone.

Example 6

Using a small-scale hydrogen peroxide production apparatus having a hydrogenation step, an oxidation step, an extraction step and a regeneration step, a working solution was cycled around, and the hydrogen partial pressure in a gas portion of the hydrogenation reactor was investigated.

The hydrogen peroxide production apparatus was constituted as follows.

Hydrogenation step: Stirred hydrogenation reactor, hydrogenation catalyst Pd supported catalyst Oxidation step: multi-stage counterflow oxidation tower type (reaction temperature: 40° C.)

The total amount of the working solution was 45 L, and the working solution was cycled around at a flow rate of 15 L/hr. The pressure in the hydrogenation reactor was controlled using nitrogen gas so as to be kept constant. The hydrogen partial pressure (=hydrogen concentration) in the gas portion depends on the reaction rate for the catalyst.

The working solution was one used for a long time, the composition being approximately as follows, although aged degraded matter that could not be analyzed was also contained.

EtAQ compounds (ethylanthraquinone and ethyltetrahydroanthraquinone) 15 mol %

AmAQ compounds (amylanthraquinone and amyltetrahydroanthraquinone) 85 mol %

Of the above, the tetrahydroanthraquinone compounds (ethyltetrahydroanthraquinone and amyltetrahydroanthraquinone) constituted 16 mol %.

The ethylanthraquinone concentration in the working solution was 0.107 mol/L, and the ethyltetrahydroanthraquinone concentration in the working solution was 0.020 mol/L.

Figure 3:
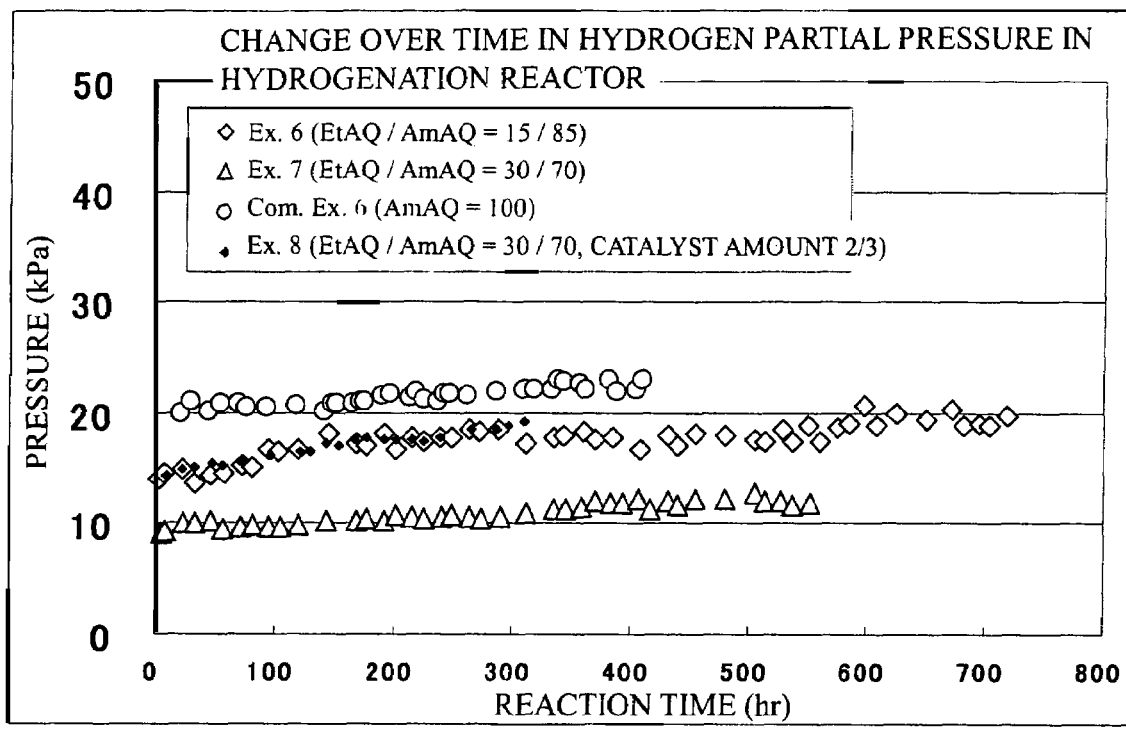
FIG. 3 is a graph showing the change over time in hydrogen partial pressure obtained for Examples 6 to 8 and Comparative Example 6.

The change over time in the hydrogen partial pressure is shown in FIG. 3. Note that a fixed amount of the hydrogenation catalyst was added to the hydrogenation reactor and then operation was carried out without replacing the hydrogenation catalyst; the degradation rate was evaluated based on the reaction time.

Example 7

The change over time in the hydrogen partial pressure upon using a working solution having the following composition used for a long time is again shown in FIG. 3. The other reaction conditions were made to be the same as in Example 6.

EtAQ compounds (ethylanthraquinone and ethyltetrahydroanthraquinone) 30 mol %

AmAQ compounds (amylanthraquinone and amyltetrahydroanthraquinone) 70 mol %

Of the above, the tetrahydroanthraquinone compounds (ethyltetrahydroanthraquinone and amyltetrahydroanthraquinone) constituted 17 mol %.

The ethylanthraquinone concentration in the working solution was 0.204 mol/L, and the ethyltetrahydroanthraquinone concentration in the working solution was 0.042 mol/L.

Example 8

Operation was carried out using the same working solution and the same conditions as in Example 7. However, the amount of the hydrogenation catalyst (Pd supported catalyst) put into the hydrogenation reactor was made to be 2/3 (weight ratio) of that in Examples 6 and 7.

Comparative Example 6

The change over time in the hydrogen partial pressure upon using a working solution having the following composition used for a long time is again shown in FIG. 3. The other reaction conditions were made to be the same as in Examples 6 and 7 (and the weight of the catalyst was also the same as in Examples 6 and 7).

AmAQ compounds (amylanthraquinone and amyltetrahydroanthraquinone) 100 mol %

Of the above, the amyltetrahydroanthraquinone) constituted 17 mol %.

From the results of Examples 6 to 8 and Comparative Example 6, it is clear that the reaction rate increases (i.e. the hydrogen partial pressure decreases) upon adding the EtAQ compounds, and the amount of the Pd supported catalyst constituting the hydrogenation catalyst can be reduced accordingly.

All literature references and patents mentioned herein are hereby incorporated in their entireties. Although the foregoing invention has been described in terms of certain preferred embodiments, other embodiments will become apparent to those of ordinary skill in the art in view of the disclosure herein without departing from the scope of the invention. Accordingly, all such modifications and changes are intended to fall within the scope of the invention, as defined by the appended claims.

What is claimed is:

1. A method for producing hydrogen peroxide, comprising the steps of:
    alternately reducing and oxidizing a working solution containing anthraquinone compounds as a reaction medium, wherein a mixture of alkyl-substituted anthraquinones and alkyl-substituted tetrahydroanthraquinones in a molar ratio of from 2:1 to 8:1 is used as the anthraquinone compounds in the working solution, in said reduction step all of the tetrahydroanthraquinones and some or all of the anthraquinones in the working solution are reduced; and keeping the content of alkyl-substituted anthrahydroquinones in the working solution after said reduction step and before said oxidation step higher than the content of alkyl-substituted tetrahydroanthrahydroquinones, wherein ethylanthraquinone and ethyltetrahydroanthraquinone are used as anthraquinone compounds in the working solution in a total proportion of both of from 10 to 45 mol % of all of the anthraquinone compounds in the working solution.

2. The method according to claim 1, wherein the ethylanthraquinone concentration in the working solution is from 0.10 to 0.45 mol/L.

3. The method according to claim 1, wherein anthraquinone compounds other than the ethylanthraquinone and the ethyltetrahydroanthraquinone are amylanthraquinone and amyltetrahydroanthraquinone.

4. The method according to claim 1, wherein a reaction temperature in the oxidation step is not more than 50° C.

5. The method according to claim 1, wherein there are contained, as solvents for the anthraquinone compounds constituting the reaction medium, an aromatic hydrocarbon being a quinone solvent, and at least one selected from the group consisting of higher alcohols, alkyl phosphates, tetra-substituted urea compounds, cyclohexanol carboxylates, and cyclic urea compounds being a hydroquinone solvent.

6. The method according to claim 1, wherein the ethylanthraquinone and the ethyltetrahydroanthraquinone are used in a total proportion of both of from 20 to 40 mol % of all of the anthraquinone compounds in the working solution.

* * * * *